Figure 1:
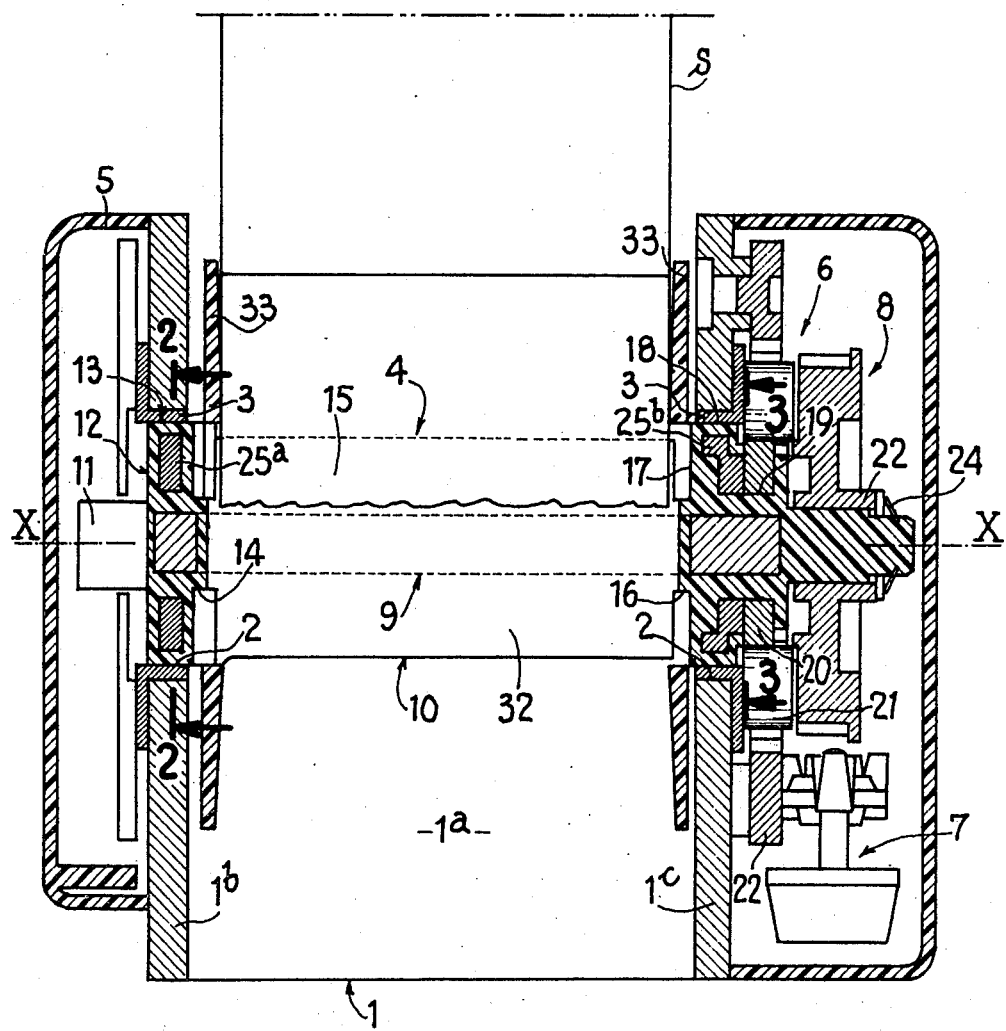

United States Patent [19]

Rietsch et al.

[11] 4,432,507
[45] Feb. 21, 1984

[54] RETRACTOR FOR A SAFETY STRAP

[75] Inventors: Maurice Rietsch, Valentigney; Jean Joly, Pont de Roide, both of France

[73] Assignee: Aciers et Outillage Peugeot, Audincourt, France

[21] Appl. No.: 485,359

[22] Filed: Apr. 15, 1983

[30] Foreign Application Priority Data

Apr. 26, 1982 [FR] France .............................. 82 07133

[51] Int. Cl.³ ...................... A62B 35/02; B65H 75/48
[52] U.S. Cl. ...................... 242/107.4 A; 242/107.4 B; 242/107
[58] Field of Search ............................ 242/107–107.7; 280/806; 297/478, 480

[56] References Cited

U.S. PATENT DOCUMENTS

| 3,291,416 | 12/1966 | Gionta | 242/107 |
| 3,552,676 | 1/1971 | Weber | 242/107.4 A |
| 4,119,281 | 10/1978 | Paitula et al. | 242/107 |
| 4,392,619 | 7/1983 | Fohl | 242/107.4 B |

FOREIGN PATENT DOCUMENTS

| 2629220 | 1/1978 | Fed. Rep. of Germany . |
| 2357465 | 2/1978 | France . |
| 2401671 | 3/1979 | France . |
| 2476491 | 8/1981 | France . |
| 2481604 | 11/1981 | France . |
| 2071993 | 9/1981 | United Kingdom ......... 242/107.4 B |

Primary Examiner—John M. Jillions
Attorney, Agent, or Firm—Sughrue, Mion, Zinn, Macpeak and Seas

[57] ABSTRACT

In this retractor, the central assembly 4 comprises a metal strip 9 and a covering 10. In the regions of the latter forming bearing surfaces for rotatively mounting the assembly 4, plates 25a, 25b are provided which are only covered with a thin layer of the covering on their periphery. In this way defects in the roundness of the central assembly and irregularities in the winding and unwinding of the strap are avoided.

8 Claims, 5 Drawing Figures

RETRACTOR FOR A SAFETY STRAP

DESCRIPTION

The present invention relates to a retractor for a safety strap of the type comprising a support, a rigid central assembly connected to one end of the strap, rotatively mounted in the support and around which the strap is intended to be wound under the action of an elastically yieldable return force, said assembly being moreover associated with a locking mechanism which is capable of preventing the rotation of the assembly in the direction for unwinding the strap when a limit value of acceleration or deceleration applied to the strap and/or to the support is exceeded, said assembly comprising as a central core a metal strip covered by a moulded plastics material in which the strap is secured and which defines two coaxial bearing surfaces by means of which bearing surfaces the assembly is rotatively mounted in the support.

A rigid central assembly, also termed a mandrel, for a retractor of this type is disclosed in DE No. 2 704 084. The metal strip imparts to this assembly the mechanical rigidity required for transmitting the forces exerted on the strap to the locking mechanism with which it is coupled by means of a rigid connection. As concerns the covering of the strip, it acts as a fastener for the strap. Further, this covering must provide the bearing surfaces engaged in bearing apertures formed in the support.

This prior arrangement lightens the construction of the retractor and facilitates the manufacture of the latter but has a drawback residing in defects in the roundness which might occur in the region of the bearing surfaces. Indeed, when moulding the covering on the metal strip, the outer shape in the region of the bearing surfaces is solely determined by the shape of the mould or die which can only be determined with a limited precision otherwise the cost of manufacturing the mould is considerably increased. If the bearing surfaces do not have a perfect roundness, the unwinding of the strap may then be irregular and this constitutes a hindrance to the user. Further, the plastics material which is highly stressed in the regions of the bearing surfaces during the many cycles of winding and unwinding to which the retractor is subjected becomes prematurely worn and this still further increases the defects in roundness.

An object of the invention is to overcome this drawback. The invention therefore provides a retractor of the type defined hereinbefore, wherein said rigid central assembly comprises at each of its ends a circular rigid reinforcing plate which is engaged perpendicularly on the corresponding end portion of the metal strip in the region of the bearing surface of said assembly and the periphery of each plate is covered only with a thin layer of the covering of plastics material.

Thus, in the region of each reinforcing plate, the plastics material is supported in an effective manner so as to form a bearing surface whose roundness is guaranteed by the circular shape of the plate which may be easily manufactured with a sufficiently high precision.

According to another feature of the invention, applicable to the case where the metal strip has a rectangular cross-sectional shape, each of said plates has an opening having the cross-sectional shape of said strip and disposed symmetrically relative to its axis, the large sides of the opening having notches in which the covering plastics material can penetrate.

Owing to this particular form of the plate, a perfect connection is achieved between the strip and the covering of plastics material.

According to another feature of the invention, the plate on the side of the rigid central assembly adjacent the locking mechanism comprises two portions projecting from one of its sides and these portions are bare at the end face of the rigid assembly so as to act as an axial support for an element which is part of said locking mechanism and is rigidly fixed to said rigid central assembly as concerns rotation of said assembly.

A precise axial positioning of this element of the locking mechanism results from this feature.

Figure 2:
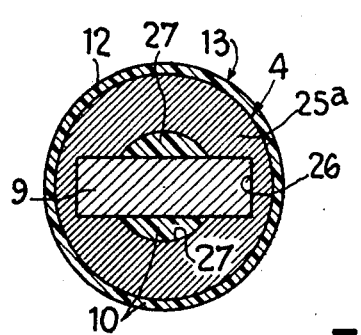
Figure 3:
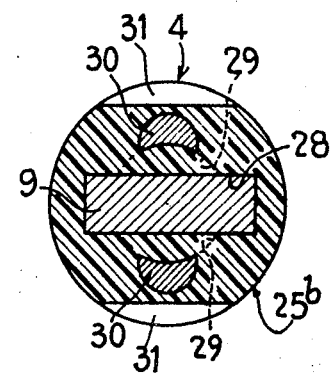
Figure 4:
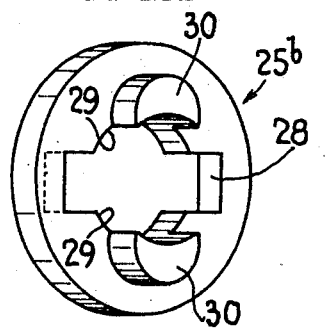
Figure 5:
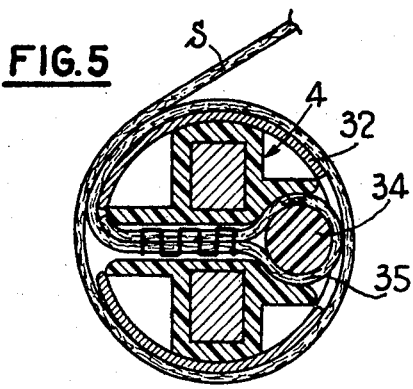

The invention is described hereinafter in more detail with reference to the accompanying drawings which show only one embodiment and in which:

FIG. 1 is an axial sectional view of a retractor for a safety strap according to the invention;

FIGS. 2 and 3 are radial sectional views taken along lines 2—2 and 3—3 respectively of FIG. 1;

FIG. 4 is a perspective view of one of the reinforcing plates employed in the central rigid assembly of the retractor, and FIG. 5 is a radial sectional view of the fastening of the strap in said rigid assembly In the embodiment shown in the drawings, the retractor of the invention comprises a support 1 in the shape of a U having a base 1a and two lateral wings 1b and 1c. These wings each have an opening 2 in alignment with the opening of the other wing and in which are placed bearings 3 having an L-shaped radial section.

The rigid central assembly 4 is rotatively mounted in the support 1 with respect to an axis X—X. A safety strap S is fastened in this assembly 4 as shown in particular in FIG. 5. This strap is retracted to its retracted configuration by means of a return spring (not shown) which is coupled between the assembly 4 and the support 1, the spring being disposed against the outer side of the wing 1b of the support and being covered by a cap 5. On the opposite side, the retractor has a locking mechanism 6 which is capable of stopping the unwinding of the strap by locking the central assembly 4 against rotation relative to the support 1. This mechanism comprises for this purpose inertia elements which are responsive either when the retractor i.e. the vehicle (pendulum 7) is subjected to impact or when the strap is suddenly unwound (inertia wheel 8). This locking mechanism will not be described in detail since there is a full description thereof in French Pat. No. 2 293 225, the certificate of addition to this U.S. patent No. 2 319 390, French Pat. No. 2 319 389 and French patent application No. 80 04 157 filed on Feb. 26, 1980, all of which documents were filed in the name of the Applicant.

However, the invention can be applicable to retractors whose locking mechanism is arranged in another way.

The rigid central assembly 4 comprises a core formed by a metal strip 9 having a constant rectangular cross-sectional shape and disposed symmetrically relative to the axis X—X of the retractor. This strip is embedded in a covering 10 of moulded plastics material whose shape will now be described in detail.

Adjacent to the return spring, this covering 10 has a cylindrical fixing lug 11 in which one end of the return spring is fixed. Connected to this lug 11 is a portion in the shape of a disc 12 whose outer cylindrical surface constitutes a bearing surface received in the bearing 3 which is mounted in the wing 1b of the support. The disc-shaped portion 12 is followed by a connecting portion 14 of small diameter followed in turn by a central portion 15 whose section has a shape which is clearly shown in FIG. 5.

On the opposite side of the retractor, the central portion 15 is connected to a connecting portion 16 of small diameter followed by a portion 17 consituting a bearing surface 18 which cooperates with the bearing 3 in this region. This portion constituting a bearing surface is connected to a mounting portion 19 in which is trapped the cam 20 of the locking mechanism 6, which cam cooperates through the medium of locking rollers 21 with an outer ring 22 rigidly fixed to the outer side of the wing 1c.

The covering 10 also has an end portion 23 consituting a spindle for the inertia wheel 8 which is retained on this portion 23 by a resiliently yieldable locking washer 24.

In order to reinforce the portions 12 and 17 forming bearing surfaces, the central rigid assembly 4 includes reinforcing plates 25a and 25b which are disposed radially relative to the axis X—X and centered on the latter. The plate 25a located adjacent to the return spring of the retractor (FIG. 2) has a circular shape and has a central opening 26 of the same section as the section of the strip 9, the large sides of this opening being provided with notches 27 in which the material of the covering can penetrate. It can also be seen that the outer periphery of the plate 25a is surrounded by a relatively thin layer of said covering which, owing to the very arrangement of the plate, can be maintained at a sufficiently constant value to ensure that defects in the roundness in this region do not disturb the correct rotation of the rigid central assembly or mandrel 4.

The plate 25b is shown more clearly in FIGS. 3 and 4. It has a generally circular shape and includes, as the plate 25a, a central rectangular opening 28 of the same section as the section of the strip 9, the large sides of this opening being provided with respective notches 29. Further, crescent-shaped projections 30 are provided, for example by means of a press operation, in the edges of the notches 29, these projections facing outwardly as shown in FIG. 1 so as to act as a radially extending support surface for axially supporting the cam 22 when the covering 10 is moulded. This covering has a uniform thickness around the periphery of the plate 25b facing the bearing 3 which also guarantees in this region a correct rotation of the mandrel 4 when the strap is unwound or wound. It will also be observed that the covering has diametrically opposed recesses 31 facing the rollers 21 of the locking mechanism 6 so as to permit a free movement of these rollers which would be difficult to achieve in the case where this covering had a continuous radial surface in this region owing to the rather wide tolerances which might exist in the longitudinal dimensions of the mandrel 4.

FIG. 5 shows the shape of the section of the mandrel 4 in the region where it receives the strap S. The latter is wound on a reel 32 provided with side flanges 33 and longitudinal slots for the passage of the strap. The latter is locked in the body of the mandrel 4 by means of a pin 34 which is engaged in a sewn loop 35 at the end of this strap.

Having now described our invention what we claim as new and desire to secure by Letters Patent is:

1. In a retractor for a safety strap of the type comprising a support, a rigid central assembly which is for connection to one end of the strap, is mounted in the support to rotate about an axis and around which assembly the strap is adapted to be wound under the action of a resiliently yieldable return force, a locking mechanism associated with said assembly for preventing the rotation of said assembly in the direction for unwinding the strap when a limit acceleration or deceleration value applied to the strap and/or to the support is exceeded, said assembly comprising as a central core a metal strip and a covering of moulded plastics material in which covering the strip is fastened, said covering having portions defining two coaxial bearing surfaces by means of which bearing surfaces the assembly is rotatively mounted in the support; the improvement comprising adjacent to each end of said rigid assembly a rigid reinforcing circular plate which is perpendicular to the strip and engaged on a corresponding end portion of the metal strip in the region of the respective bearing surface of said assembly, each plate having a periphery which is covered only with a thin layer of said covering of plastics material.

2. A retractor according to claim 1, wherein the metal strip has a rectangular cross-sectional shape and each of said plates has an opening which has the same cross-sectional shape as said strip and is disposed symmetrically relative to said axis of rotation, the opening having large sides in which are provided notches in which the plastics material of the covering penetrates.

3. A retractor according to claim 1, wherein the plate which is adjacent to an end of the rigid central assembly which is adjacent to the locking mechanism comprises two portions which project from a side of the plate and said projecting portions are bare at an end face of the rigid assembly so as to act as an axial support for an element which is part of said locking mechanism and rigidly fixed to rotate with said rigid central assembly.

4. A retractor according to claim 2, wherein the plate which is adjacent to an end of the rigid central assembly which is adjacent to the locking mechanism comprises two portions which project from a side of the plate and said projecting portions are bare at an end face of the rigid assembly so as to act as an axial support for an element which is part of said locking mechanism and rigidly fixed to rotate with said rigid central assembly.

5. A retractor according to claim 1, wherein each of the portions of said covering forming a bearing surface are connected to a central portion of said covering by portions of reduced diameter.

6. A retractor according to claim 2, wherein each of the portions of said covering forming a bearing surface are connected to a central portion of said covering by portions of reduced diameter.

7. A retractor according to claim 3, wherein each of the portions of said covering forming a bearing surface are connected to a central portion of said covering by portions of reduced diameter.

8. A retractor according to claim 4, wherein each of the portions of said covering forming a bearing surface are connected to a central portion of said covering by portions of reduced diameter.

* * * * *